Dec. 19, 1967   D. M. HUNT ET AL   3,358,587
FOOD COOKERS

Filed Jan. 24, 1966   3 Sheets-Sheet 1

INVENTORS
DELVIN M. HUNT,
WILLIAM R. CLARK, JR.
BY J. Harold Kilcoyne
ATTORNEY

Dec. 19, 1967 D. M. HUNT ETAL 3,358,587
FOOD COOKERS
Filed Jan. 24, 1966 3 Sheets-Sheet 2
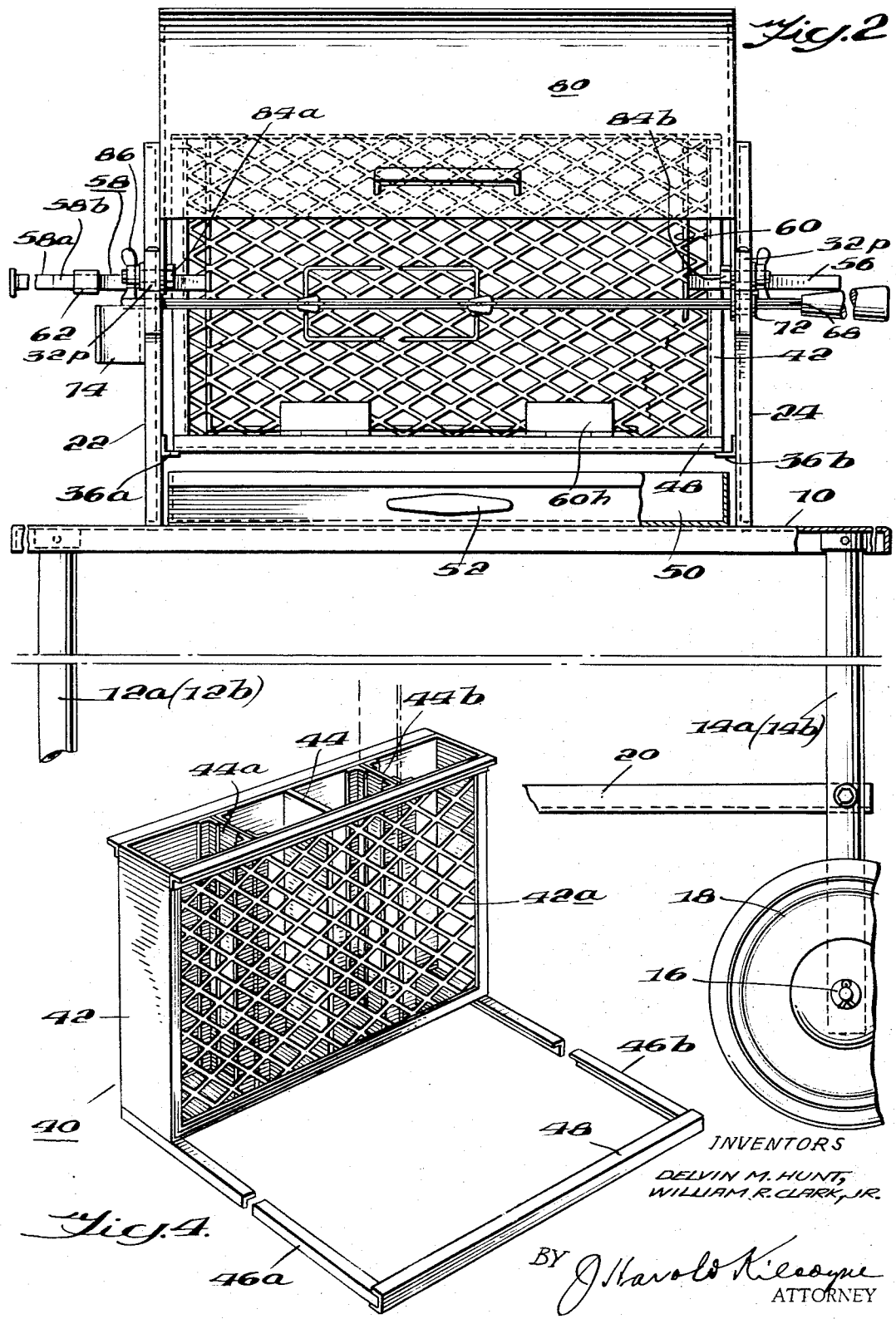
INVENTORS
DELVIN M. HUNT,
WILLIAM R. CLARK, JR.
BY J. Harold Kilcoyne
ATTORNEY

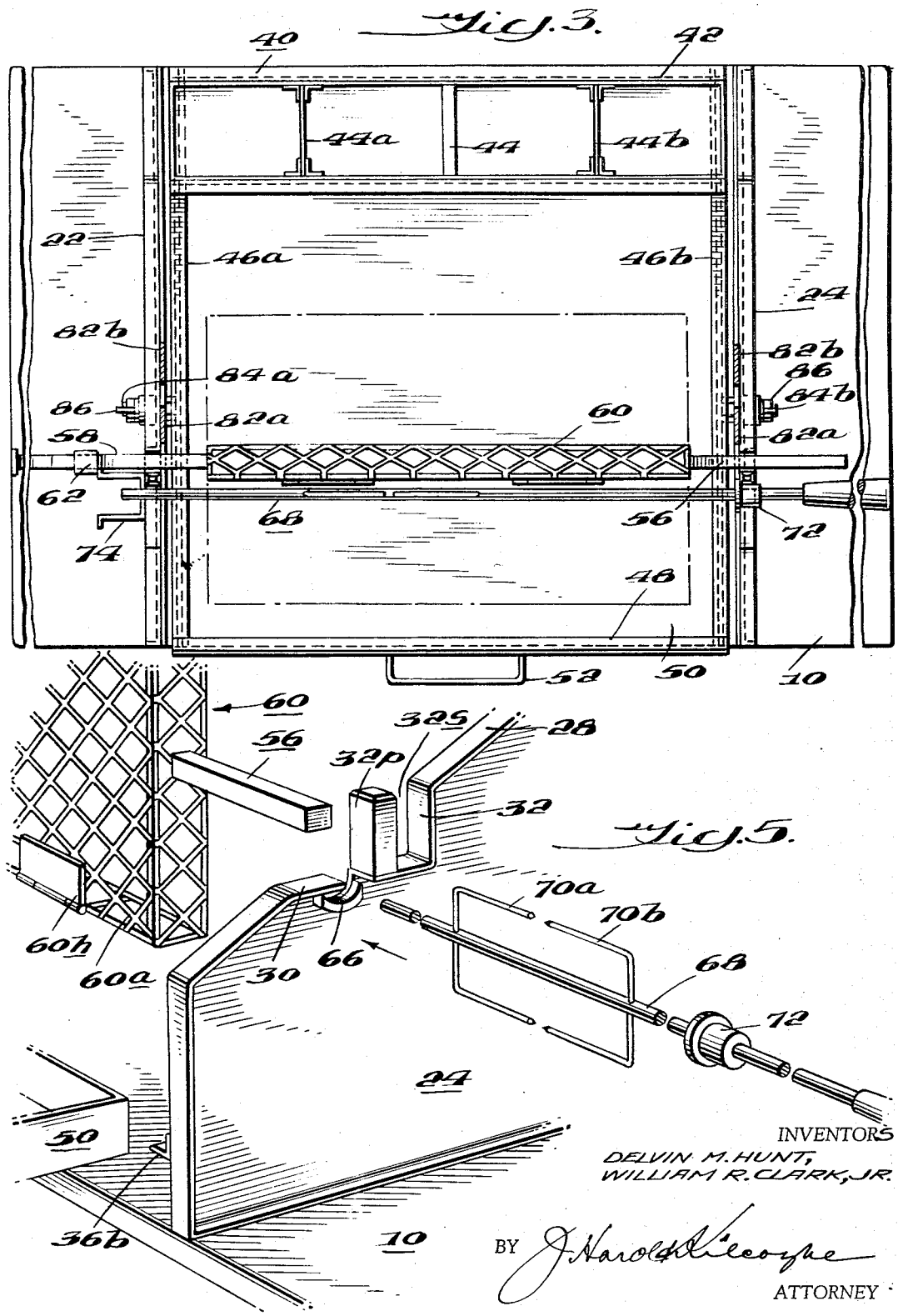

United States Patent Office 3,358,587
Patented Dec. 19, 1967

3,358,587
FOOD COOKERS
Delvin M. Hunt, 27 Rio Vista Drive 40207, and William R. Clark, Jr., 1874 Trevilian Way 40205, both of Louisville, Ky.
Filed Jan. 24, 1966, Ser. No. 522,495
8 Claims. (Cl. 99—421)

ABSTRACT OF THE DISCLOSURE

The subject food cooker is designed to function as an outdoor grill. It comprises a raised horizontal supporting surface mounting spaced apart, upright side members which together form an open top and open front-and-rear enclosure defining an open-ended throughway. A front-to-rear trackway is provided in said throughway at a level above that of the supporting surface and a fire-box and slide frame assembly, the fire-box component of which is vertically disposed, is mounted on said trackway for movement therealong and for also bodily movement from the throughway through either end thereof. A catch pan or drawer disposed on said supporting surface beneath the trackway is similarly moveable along the throughway and from same through either open end thereof. Means supported from the top edges of the side members serve to hold the food to be cooked in a position forwardly of the fire-box. The side members also mount an angularly adjustable hood having a heat-reflective under surface in position such that heat rays emanating from the fuel burning in the fire-box are reflected downwardly-rearwardly onto the food in said holder.

---

This invention relates to improvements in food cookers, of the type commonly referred to as portable charcoal grills, and more particularly to an improved vertical grill, i.e. one having its fire box and broiler or grid for holding the meat, fowl or the like being cooked disposed in vertical position rather than horizontally, as is conventional.

While so-called vertical grills are known and, theoretically at least, have certain advantages over conventional horizontal grills, particularly in insuring against the item or items of food being cooked, usually steak or fowl, taking on an objectionable flavor from the smoke and gases resulting from the burning and consequent decomposition of the fat dripping therefrom, which is likely when cooking with a horizontal grill, the vertical grills have been accorded at best only limited acceptance. Analysis of the reasons for this lack of popularity of vertical grills gives indication that such stems from the fact that either their vertical fire-boxes have fixed position and hence they are devoid of means for regulating the intensity of the heat applied to the steak, fowl, etc. being cooked, or their vertical fire-boxes if mounted for movement for purpose of heat regulation, cannot be readily and/or safely moved during cooking, as in the case when the grills employ hang-type vertical fire-boxes.

Stated broadly, a major object of the present invention is the provision of an improved design of a vertical outdoor or charcoal grill characterized by a fire-box mounting which enables ready and safe movement of the vertical fire-box toward and away from the steak or other food being cooked, as effects regulation of the heat being directed thereto, and which also provides for simple demounting of the fire-box and/or the catch pan or drawer for dumping and cleaning purposes, and equally simple re-mounting thereof for a following cooking operation.

Another important object of the invention is the provision of an improved design of vertical charcoal grill characterized as in the foregoing, which is further characterized by substantially smokeless operation.

Other objects of the invention are to provide a vertical fire-box type charcoal grill of rugged, durable construction suited to a variety of outdoor uses and to provide such a grill which is also thoroughly safe, flashproof and dependable in its operation.

The above and other objects and features of advantage of a portable outdoor or charcoal grill according to the present invention will be clear from the following detailed description taken with the accompanying drawings illustrating a preferred physical embodiment thereof, wherein—

FIG. 2 is a broken-away, part-sectional front elevation thereof;

FIG. 3 is a top view of said grill proper with the reflecting hood cut away along line 3—3 of FIG. 1;

FIG. 4 is a broken-away, perspective view illustrating the upright fire-box and laterally extending side frame assembly of the invention removed from its supporting means; and FIG. 5 is a broken-away, perspective view illustrating the details of the broiler and spit mounting means serving alternately to mount a broiler and a motor-turned spit.

Figure 1:
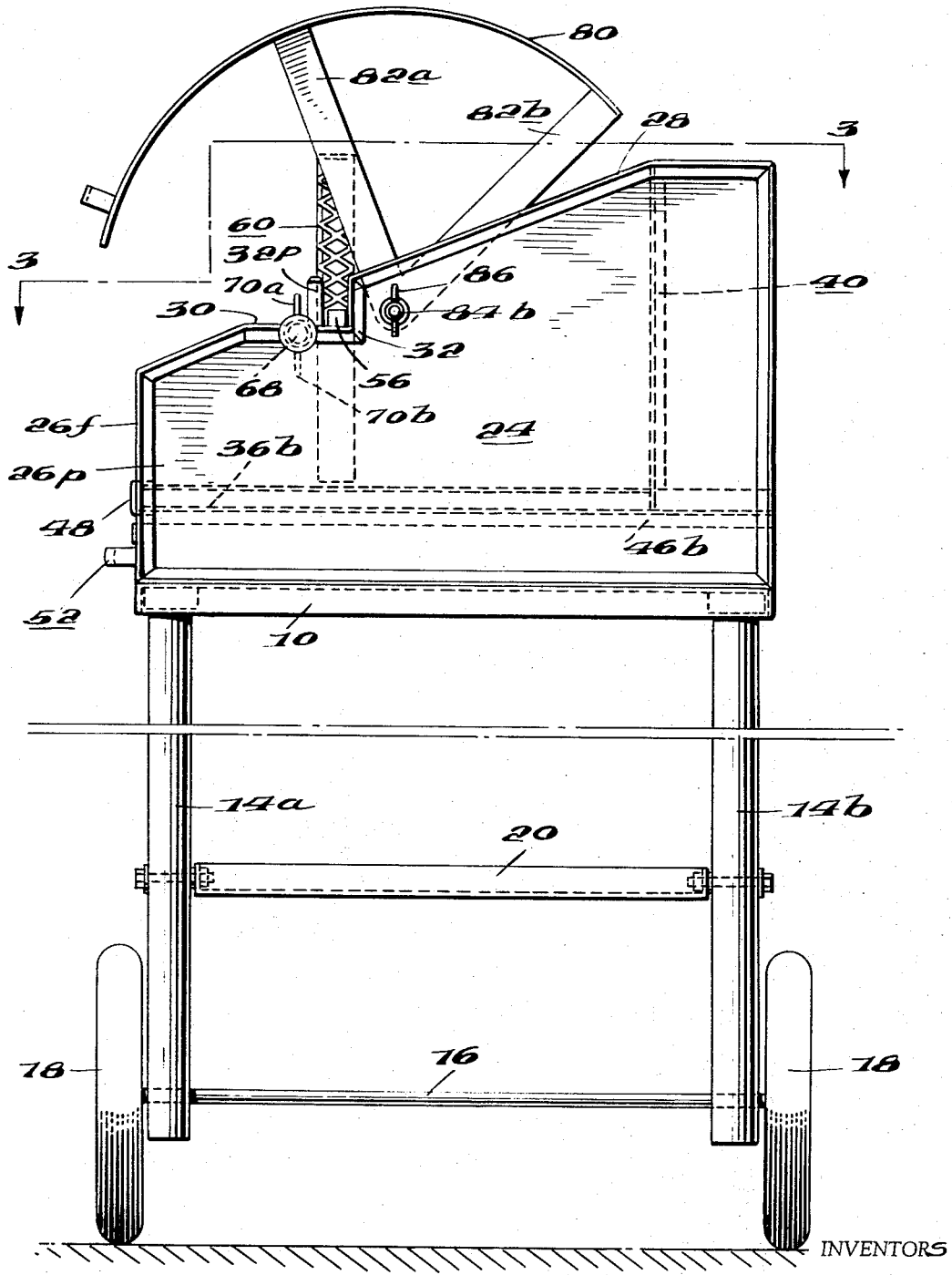
FIG. 1 is an end elevation of said grill.

Referring to the drawings in detail, a portable outdoor grill of the invention preferably employs a table structure to mount the grill proper in an elevated position with respect to the ground or other surface, such comprising an elongated rectangular table top 10 supported on end pairs of legs 12a, 12b, 14a, 14b, of which one end pair mounts on a transverse axle 16 extending therebetween a pair of wheels 18 enabling the table structure and thereby the grill mounted thereon to be bodily wheeled about from place to place as desired. Preferably also, the aforesaid table structure 10–18 mounts a shelf 20 affixed to and supported by said legs at a lower level than the table top 10, and mounts a shelf 20 affixed to and supported by said legs at a lower level than the table top 10, and being provided along its marginal edges with an upstanding retaining flange, the shelf thus providing a convenient carrying and retaining surface for the cooking utensils, condiments, etc. usually required in cooking on an outdoor grill.

Welded or otherwise secured fast to the upper side of the table top 10 and extending from front to rear edges thereof is a pair of like spaced-apart upright side members 22, 24, each illustratively fashioned from a marginal angle-iron frame 26f and a sheet metal panel 26p affixed thereto. By reference to FIGS. 2 and 3, said side members, together with the table top, form a partial enclosure, that is, one which is open on its top and at its front and rear sides, as provides a front-to-rear throughway between the side members. As best seen in FIG. 1, said side members have modified rectangular configuration, being each defined edgewise by a straight bottom edge, vertical front and rear edges, and by a top edge which is downwardly inclined for an intermediate length portion from a point spaced forwardly of its rear edge to its front edge by an angle of approximately 30° from the horizontal. Moreover, said inclined edge portion which is indicated at 28 (FIG. 1) is interrupted near its juncture with the front edge of the side member by a horizontal step portion 30 and a connected vertical riser portion 32, the purpose of which latter portions will be described hereinafter.

Affixed to and secured flush against the inner faces of the panels of the upright side members 22, 24 and at a fixed distance above the table top is a trackway formed by a pair of horizontal, front-to-rear extending track members 36a, 36b. Illustratively, said track members are comprised by straight lengths of L-angle irons turned so that their horizontal flanges project towards one another into the front-to-rear throughway provided between said upright side members.

According to the invention, a fire-box and slide frame assembly generally designated 40, FIG. 4, is mounted to slide on the trackway defined by the aforesaid track members 36a, 36b. Illustratively, said assembly comprises an open-top, transversely elongated, rectangular fire box 42 defined by closed bottom, side and rear walls and a reticulated front wall (the latter being designated 14a), of height and length as to be readily accommodated between the side members 22, 24; and a forwardly extending, open slide frame comprising spaced-apart, forwardly extending angle members 46a, 46b, to the rear ends of which the fire-box 42 is rigidly attached, and which are cross-connected at their forward ends by a channel iron 48 extending therebetween. Said channel member, in addition to closing and thereby strengthening the forward end of the slide frame, also serves as a handle for manually sliding the fire-box 42 toward and away from the food being cooked, usually a steak held in vertical position in a grid-type broiler or a fowl turning on a spit.

Illustratively, the fire-box 42 is rigidified by a central front-to-rear strut 44 enabling the fire-box to maintain its shape under heat and during the sometimes roughly performed operation of dumping and cleaning, and it is also preferably provided with removable divider plates 14a, 14b disposed laterally of said cross brace serving as fuel economizers. That is to say, said plates are inserted when but a small width of fire is required and are pulled out when a full width of fire is desired or considered necessary.

According to a further feature of the invention, the table top 10 of the table structure supports, in the throughway or space between the side members 22, 24 and below the trackway provided by the track members 36a, 36b an open-top pan or drawer 50 having a pull handle 52 projecting from the front vertical wall of the latter. Thus, said pan is positioned to catch fat dripping from the food being cooked and, being sufficiently deep as to extend beneath the fire-box 42 in all positions of the latter, it will trap any ash or burning embers falling thereto through the reticulated front wall 42a of said fire-box.

From the above, it will be appreciated that the position of the fire-box 42 along the trackway defined by the front-to-rear track members may be varied at will by using the cross channel 48 as a pull or push handle; and also that both the fire-box and slide frame assembly 40 and the catch pan 50 are each bodily and separately demountable from the table structure and the upright side members 22, 24 carried thereby through either the always open front or rear end of the throughway as defined by said side members, for dumping of ashes, cleaning of drippings, etc. as may be necessary.

Reverting to the horizontal step portions 30 provided in the inclined top edges of the upright side members, such, in conjunction with the aforesaid vertical riser portions 32 associated therewith and with peg-like upright posts 32p affixed to said step portions at a predetermined fixed distance from and forwardly of said riser portions, provide in effect vertical notches or slots 32a in the side-member top edges for the reception of arms 56, 58 which are fixedly carried by and project laterally from the ends of a preferably basket-type steak grid or broiler 60, and which serve as trunnions enabling the broiler to turn to opposite 180° positions about the axis of said arms 56, 58, as is necessary to present both faces of a steak to the heat of the charcoal burning in the fire-box 42.

Said broiler 60 is of reticulated construction throughout, is rectangular as viewed from front and rear, and one vertical wall designated 60h is hingedly connected as by hinges 60h to the broiler body so as to swing to an open position with respect to the latter. Various means for securing said swing-open wall 60a to the broiler body may be employed, with one simple means being generally illustrated in FIG. 2. More particularly, whereas the right-side arm 56 is of one piece construction and is secured as by welding to the right-end wall of the broiler body, the left-side arm 58 comprises two complemental sections designated 58a, 58b, one of which having greater length is affixed to the broiler body and the other of lesser length to the swing-open wall 60a thereof. Normally, said left-side arm sections 58a, 58 are held together as by a slide clip 62 permanently carried by the longer arm section and which, when slid over the shorter arm section, secures said swing-open wall in its closed position.

Preferably, said grid or broiler-supporting arms 56 and 58, whether unitary or sectional, have square section and they are oriented so that two flat sides thereof are at a right angle to the height line of the broiler. Accordingly, when said arms are inserted into the aforesaid notches or slots 32s in the top edges of the side members 22, 24 and the broiler disposed vertically, the latter will maintain itself vertical by virtue of a flat surface of the arm engaging on the correspondingly flat (horizontal) surface of the step portions 30 provided along said top edges. Preferably, the section of said arms 56, 58 is also such as permits the arms to turn 180° on their common axis within the space provided between the aforesaid riser portions 32 and the associated peg-like posts 32p.

The upright side members 22, 24 also provide means for mounting rotatable spit means for holding a fowl, roast or the like in cooking position forwardly of the fire-box 42. More particularly, the top edges of the side members are provided, preferably in their aforesaid horizontal step portions 30 and just forwardly of the posts 32p, with upwardly opening notches 66 for the reception of opposite end portions of a transversely extending spit shaft 68 carrying opposed impaling prongs 70a, 70b. The right end of said shaft mounts a bearing bushing 72 adapted to seat in the right-side notch 66 provided in the top edge of side member 22, whereas the left end of said shaft extends through the corresponding and aligned left-side notch 66 in the top edge of the side member 24 and thence into the interior space of a bracket 74 affixed to the outer face of the panel of said side member and which is adapted to removably mount a motor for imparting controlled rotation of said shaft 68 and thereby of the fowl, roast, etc. held by the prongs 70a, 70b.

According to a further feature of the invention, a hood 80 is mounted for motion in forward and rearward directions and in an arcuate path which extends above the aforesaid food-holding means, i.e. broiler or spit. Referring to FIG. 1, said hood comprises a rectangular metal sheet of width to be readily accommodated between the upright side members 22, 24 and being bent to extend along an arc of approximately 120°. Said sheet is carried on side pairs of angularly related bracket arms 82a, 82b swingable forwardly and rearwardly about the common axis of mounting bolts 84a, 84b passed through the panels of the side members 22, 24. Wing nuts 86 on said bolts provide a ready means for securing the bracket arms and hence the hood as a unit in a fixed position of adjustment. Preferably, the under face of the hood is reflective, thus being capable or reflecting heat rays from the burning charcoal in the fire-box 42 onto the upper and to a degree the forward portions of the meat or fowl being cooked.

It is noted that the aforesaid hood-mounting bracket arms 82a, 82b move in planes which intersect the axis of the arms 56, 58 of the broiler 60 when the latter is mounted in cooking position. Thus, by moving the hood forwardly, the two more forward arms of the hood-supporting brackets will press against said holder arms 56, 58, thus insuring that the broiler will be disposed and held parallel to the fire box 42.

Without further analysis, it will be appreciated that a charcoal grill as described and illustrated achieves the objectives of the invention as above set forth in simple, effective and thoroughly dependable manner. That is to say, when the grill is in use, the vertically disposed fire-box is readily movable toward and away from the holder for the meat or fowl being cooked, thus to vary the intensity of the heat being applied to the latter, and this movement can be manually effected with maximum safety to the person in attendance. Since the drippings fall into a drip pan rather than onto burning charcoal, as is the case of grills of the horizontal fire-box type, substantially smokeless cooking is achieved. Even problem meats such as pork, ducks, etc. which are likely to engender flash fires if cooked on a horizontal grill, will cook unattended and with never a flash fire for hours on a vertical grill of the instant design, and when fully cooked will have an attractive golden color and will be ideally moist rather than dried out.

Moreover, a charcoal grill of the invention is notable for the ease with which its component parts may be cleaned and prepared for re-use, which follows from the fact that both the fire-box assembly and the drippings catch pan are not only completely but also readily demountable simply by sliding same through either the open front or rear sides of the grill enclosure, for cleaning as separate units, and after cleaning are just as readily mounted for the next cooking operation.

As many changes could be made in carrying out the above constructions without departing from the scope of the invention, it is intended that all matter contained in the above description or shown in the accompanying drawings shall be interpreted as illustrative and not in a limiting sense.

We claim:

1. A charcoal grill comprising, in combination: support means providing a horizontal supporting surface; spaced-apart upright side members affixed to said supporting surface and forming with said supporting surface a partial enclosure which is open on top and on its front and rear sides; a horizontal trackway extending in front-to-rear direction through said partial enclosure and at a level above that of said supporting surface; a fire-box and slide frame assembly supported on said trackway for movement therealong and being bodily removable and remountable through either the open front or rear side of said partial enclosure, said assembly comprising a vertically disposed fire-box disposed to extend transversely of said space and a horizontal slide frame having its rearward end rigidly affixed to the lower portion of said fire-box and extending forwardly therefrom, the forward end of said slide frame incorporating handle means for manually adjusting the front-to-rear position of the fire-box along the trackway; means on said upright side members for mounting the holding means for the meat, fowl or the like being cooked forwardly of said fire-box; and a drawer serving as a catch pan supported on said supporting surface in the space between said side members and below the trackway and being also bodily removable and remountable through either the open front or rear side of said partial enclosure.

2. A charcoal grill according to claim 1, wherein the trackway comprises a pair of track members affixed to the inner surfaces of the upright side members.

3. A charcoal grill according to claim 1, wherein the fire-box comprises an elongated rectangular open-top box srtucture having closed bottom, end and rear walls and a reticulated front wall.

4. A charcoal grill according to claim 1, wherein the means for mounting the holding means for the meat, fowl and the like being cooked is disposed in the upper edge portions of the side members.

5. A charcoal grill according to claim 4, wherein said meat and fowl-holding mounting means comprises upwardly opening notch-like provisions in the upper edges of the side members located intermediate the length of said edges.

6. A charcoal grill according to claim 1, and further including a hood and means mounting same on the upright side members for swinging motion in an arcuate forward-rearward path extending between and above said side members.

7. A charcoal grill according to claim 6, wherein said hood has a reflective under surface serving to reflect heat from the burning charcoal in the fire-box to the meat, fowl or the like being cooked.

8. A charcoal grill according to claim 6, wherein said hood mounting means incorporates means for securing the hood in a desired angular position along its arcuate path of movement.

References Cited

UNITED STATES PATENTS

| | | | |
|---|---|---|---|
| 2,792,773 | 5/1957 | Barker | 99—421 |
| 2,891,465 | 6/1959 | Rogge | 99—345 |
| 2,900,482 | 8/1959 | Aylor. | |
| 2,970,005 | 1/1961 | Schillinger | 312—284 X |
| 3,016,816 | 1/1962 | Persinger et al. | 99—443 X |
| 3,018,772 | 1/1962 | Blazey | 99—340 X |
| 3,052,177 | 9/1962 | Lombardo | 99—390 |
| 3,096,706 | 7/1963 | Cardwell | 99—399 X |
| 3,285,238 | 11/1966 | Norlie | 126—25 X |
| 3,296,955 | 1/1967 | Schaniel | 99—421 |

FOREIGN PATENTS 369,270   6/1963   Switzerland.

WALTER A. SCHEEL, *Primary Examiner.*
A. O. HENDERSON, *Assistant Examiner.*